United States Patent
Beckmann

[11] Patent Number: 6,146,564
[45] Date of Patent: *Nov. 14, 2000

[54] PROCESS FOR THE PRODUCTION OF PLASTIC MOLDED PARTS WITH DECORATIVE LAMINATION

[75] Inventor: Friedhelm Beckmann, Hiddenhausen, Germany

[73] Assignee: Möller Plast GmbH, Bielefeld, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/816,882
[22] PCT Filed: Oct. 31, 1994
[86] PCT No.: PCT/EP94/03572
  § 371 Date: Jul. 31, 1995
  § 102(e) Date: Jul. 31, 1995
[87] PCT Pub. No.: WO95/16552
  PCT Pub. Date: Jun. 22, 1995

Related U.S. Application Data

[63] Continuation of application No. 08/500,923, Jul. 31, 1995, abandoned.

[30] Foreign Application Priority Data

Dec. 15, 1993 [DE] Germany ................ 43 42 729

[51] Int. Cl.⁷ .................... B29C 44/06; B29C 44/12
[52] U.S. Cl. .................... 264/46.5; 264/46.4; 156/79; 156/245
[58] Field of Search ............. 264/46.5, 328.7, 264/46.4; 156/79, 245

[56] References Cited

U.S. PATENT DOCUMENTS

| | | | |
|---|---|---|---|
| 3,088,539 | 5/1963 | Mathues et al. | 156/79 |
| 3,647,588 | 3/1972 | Greig | 156/79 |
| 3,825,637 | 7/1974 | Robin | 264/328.7 |
| 3,865,915 | 2/1975 | Garner | 264/328.7 |
| 4,303,695 | 12/1981 | McCann et al. | 156/79 |
| 4,328,273 | 5/1982 | Yackiw | 156/79 |
| 4,422,988 | 12/1983 | Kornylak | 264/46.5 |
| 4,546,899 | 10/1985 | Williams | |
| 4,923,539 | 5/1990 | Spengler et al. | 156/79 |
| 4,923,653 | 5/1990 | Matsuura et al. | 264/40.3 |
| 5,034,076 | 7/1991 | Masui et al. | 156/79 |
| 5,186,777 | 2/1993 | Perenon et al. | 156/79 |
| 5,271,885 | 12/1993 | Denker et al. | 264/46.5 |
| 5,281,376 | 1/1994 | Hara et al. | 264/328.7 |
| 5,292,465 | 3/1994 | Kobayashi et al. | 264/328.7 |
| 5,374,383 | 12/1994 | Brambach | 264/46.5 |
| 5,389,317 | 2/1995 | Grimmer | 264/46.5 |

(List continued on next page.)

FOREIGN PATENT DOCUMENTS

| | | | |
|---|---|---|---|
| 0363594 | 10/1991 | European Pat. Off. | |
| 2 405 125 | 6/1979 | France | 156/79 |
| 2643308 | 8/1990 | France | |
| 22 20 939 | 11/1973 | Germany | |
| 3907318 C2 | 9/1991 | Germany | |
| 4024274 | 2/1992 | Germany | 264/46.5 |
| 4024274 A1 | 2/1992 | Germany | |
| 49-35067 | 9/1974 | Japan | 156/79 |
| 57-182412 | 11/1982 | Japan | 264/46.5 |
| 1195007 | 8/1989 | Japan | 264/46.5 |
| 1182104 | 2/1970 | United Kingdom | |
| 2273457 | 6/1994 | United Kingdom | |
| 9317854 | 9/1993 | WIPO | |

*Primary Examiner*—Allan R. Kuhns
*Attorney, Agent, or Firm*—Pollock, Vande Sande & Amernick

[57] ABSTRACT

In a process for the production of molded parts that have a lamination of decorative material, as well as a foam layer between the decorative material and the molded part, the decorative material is first provided with an unfoamed backside layer. The backside layer is then connected to the molded part and expanded, while connected to the molded part, under the effect of heat.

17 Claims, 1 Drawing Sheet

U.S. PATENT DOCUMENTS

| | | | |
|---|---|---|---|
| 5,397,409 | 3/1995 | Kornylo | 156/79 |
| 5,449,425 | 9/1995 | Renard et al. | 156/79 |
| 5,500,168 | 3/1996 | Suzuki | 264/46.5 |
| 5,500,169 | 3/1996 | Kondo et al. | 264/46.5 |
| 5,571,355 | 11/1996 | Kornylo | 156/79 |
| 5,618,477 | 4/1997 | Suzuki | 264/46.5 |
| 5,658,652 | 8/1997 | Sellergren | 156/79 |

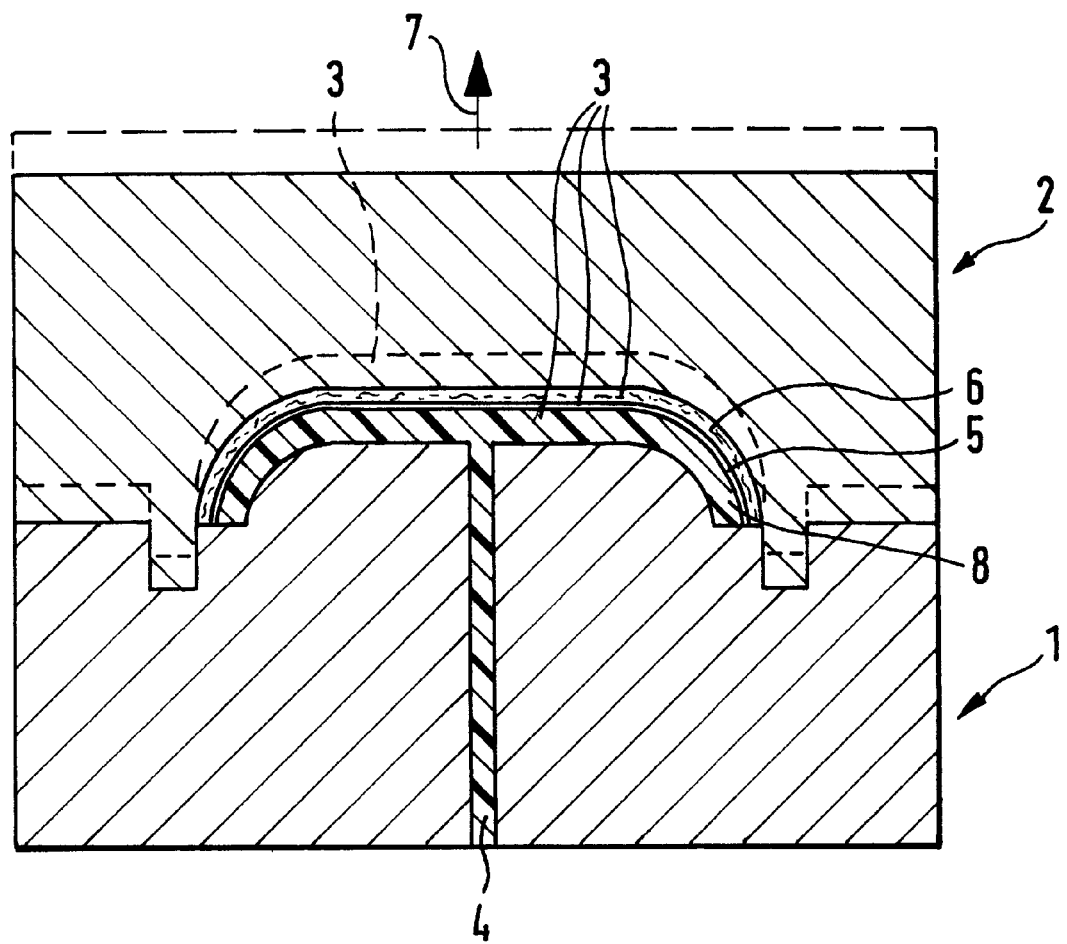

PROCESS FOR THE PRODUCTION OF PLASTIC MOLDED PARTS WITH DECORATIVE LAMINATION

This application is a Continuation of U.S. patent application Ser. No. 08/500,923, filed Jul. 31, 1995, now abandoned.

TECHNICAL FIELD

The invention concerns a process for the production of plastic molded parts with decorative lamination, as well as a foam layer between the decorative material and the plastic molded part. The foam layer is placed first in an unfoamed state between the decorative material and the plastic molded part, and then expanded by the application of heat.

BACKGROUND OF THE INVENTION

Plastic molded parts used in the automobile industry for interior trim often have a lamination of decorative material. The decorative material may be, for instance, cloth, carpet, synthetic leather, leather, and the like.

The lamination material is often applied to the plastic part after the part is formed. Such a process is costly, and in many cases also not technically and aesthetically satisfactory.

Therefore, a process was already known in the art of working with the so-called back-injection technique. In this back-injection technique, the molded part is produced together with the decorative material in one step. However, the known back-injection technique normally requires decorative materials that can withstand the high pressures and temperatures that occur in the injection molding process. Even if the pressures are significantly reduced by the use of costly hot runner systems, decorative materials made of cloth, for example, must be provided with an additional lamination of nonwoven fabric or foam for this process. These backside layers serving as protective layers are normally applied with an adhesive compound or by flame lamination. The use of nonwoven fabric or foam layers has the disadvantage that the finished part surface does not always meet the required specifications. Using the known process, unattractive surface imperfections cannot be ruled out, such as those that ensue from the so-called "clothes-iron effect," especially in the case of surface areas with complicated forms.

A process is also known for the production of a padded polypropylene trim component, especially for automobiles (DE 40 24 274 A1). In this process, the trim component has three different layers, a backing, a padding layer and a film-like surface laminate. The backing consists of a polypropylene injection-molded part produced in a single injection-molding step. The backing layer or part and the film-like surface laminates are laid together at the walls in complementary mold halves. Unfoamed polypropylene material is inserted into the free space between the surface laminate and the backing part, and afterwards, the initially unfoamed, expandable material is expanded to form the padding within the closed mold.

This known process is costly. It automatically requires two different machines, a first machine to form the backing part and another machine in which the actual lamination takes place. Furthermore, the application of carefully dosed quantities of unfoamed material into the open space between the backing layer and the surface laminate in the main mold is problematic.

SUMMARY OF THE INVENTION

Based on the state of the art summarized above, the present goal of the invention is to design an improved process for the method known that is simple and inexpensive to carry out, and that leads to a surface appearance of high quality, while creating forms of any kind.

The solution of this problem is found by the present invention method, in which the decorative material is equipped with an initially unfoamed backside layer, the backside layer is connected to the plastic molded part, and the backside layer is expanded while being connected to the plastic molded part.

In a preferred embodiment of the invention, the expansion takes place within a mold in which the exterior side of the decorative material lies against the wall of the mold, with the backside layer in an unexpanded state.

In a preferred embodiment of the invention, the plastic molded part to be laminated is an injection-molded part. It can also be preferred for the molded part to be from a blowing mold or deep-draw mold.

In one preferred embodiment of the invention-specific process, the unexpanded backside layer of the decorative material, which also serves as a protective layer, is relatively thin. This makes it possible for the decorative materials to follow the surface contour of the plastic molded part. Especially high surface quality is obtained if the visible surface side of the lamination material is limited in its expansion by a wall of the mold during the foaming process that occurs under the effect of heat. The surface contours of the decorative material are then pressed against the opposite wall of the mold by the expanding material, which results in high surface accuracy.

It has proven to be especially useful if the heat required for expanding the backside layer is produced by the heat content of the molded part.

It is also possible, however, to effect the expansion of the initially unfoamed backside layer after fully forming the molded part by way of additional heat application.

Especially preferred is a solution by which the cavity of the machine used to form the foam areas is enlarged after the process of molding the molded part. Under such a process, the decorative material with the unfoamed backside is placed into the cavity of an injection mold, for instance. In a first step, the injection molded part is formed, after already being tightly connected to the unfoamed backside lamination of the decorative material during the injection process. In this first step of the process, the desired elastic foam layer has not yet been formed. The formation and limitation of the foam layer is effected in a second step of the process. To this end, for instance, the injection mold used initially in a preliminary position can be changed such that the wall of the cavity against which the visible side of the decorative material lies is removed by a desired distance from the opposite mold wall. The distance of the mold wall shift corresponds to the desired thickness of the foam layer to be formed. This process can also be carried out in two different molds.

The invention process also allows for an enlargement of the cavity only in partial areas of the mold, and also in different spots. As a result, areas of different hardness may be formed in the same laminated molded part by varying the thickness of the backside layer to be expanded in the foaming process.

BRIEF DESCRIPTION OF THE FIGURE

FIG. 1 shows a purely schematic representation of a cross-section of an injection mold.

DETAILED DESCRIPTION OF THE INVENTION

The first mold half is designated by 1, the second mold half is designed by 2. The cavity as a whole is designated by 3. The injection molding material 8 is injected through the sprue runner 4 into the cavity onto the back side of the initially unfoamed backside layer 5 of the decorative material 6, the visible side of which lies against the interior wall of the mold half 2. After the injection process, the entire cavity 3 is filled up. Afterwards, mold half 2 is shifted in the direction of the arrow 7 by the thickness of the expanded foam layer to be formed. In the shifted position, the interior wall of the cavity takes the position indicated by the dotted line in the form half 2. Now, the initially unfoamed backside layer, which is activated by heat, can be formed in such a way that the molded part attains its definitive surface form.

What is claimed is:

1. A process for the production of molded parts having a lamination of decorative material and a foam layer between the decorative material and a molded part, said process comprising the steps of:

providing the decorative material with an unfoamed backside layer;

placing the decorative material which has been provided with the unfoamed backside layer in a cavity of an injection mold;

bonding the unfoamed backside layer to the molded part; and expanding the unfoamed backside layer while it is bonded to the molded part to form the foam layer by application of heat.

2. A process according to claim 1, wherein the backside layer expands at a temperature of more than 100° C.

3. A process according to claim 1, wherein the molded part is an injection molded part.

4. A process according to claim 1, wherein the molded part is a blow-molded part.

5. A process according to claim 1, wherein the molded part is a deep-drawn molded part.

6. A process according to claim 1, wherein the molded part is a press-molded part.

7. A process according to claim 1, wherein the expansion of the backside layer takes place in a mold separate from a mold used to form the molded part.

8. A process according to claim 1, wherein the heat required for the expansion of the backside layer is provided by the heat content of the molded part.

9. A process according to claim 1, wherein the expansion of the initially unfoamed backside layer is effected after the molded part is fully formed by the application of additional heat.

10. A process according to claim 1, wherein:

expansion of said foam backside layer is effected within the mold, said mold including a cavity including a wall;

an exterior side of the decorative material lies on said wall after the expansion of the backside layer.

11. A process according to claim 10, wherein the molded part is formed inside of the mold.

12. A process according to claim 10, wherein the initially unfoamed backside layer is pre-heated before the foaming process.

13. A process according to claim 12, wherein the pre-heating takes place outside of the cavity.

14. A process according to claim 12, wherein the pre-heating takes place within the cavity.

15. A process according to claim 1 further comprising:

forming the molded part as an injection molded part in the cavity and connecting the molded part to the backside layer during the injection process.

16. A process according to claim 1 further comprising the step of arranging the molded part to face said backside layer of said decorative material.

17. A process according to claim 1 further comprising the steps of:

forming the molded part in the cavity of the mold; and enlarging the cavity before the unfoamed backside layer is expanded.

* * * * *